United States Patent [19]
Hook

[11] 3,771,651
[45] Nov. 13, 1973

[54] ROOT CROP CLEANING ROLLS

[75] Inventor: Richard Wayne Hook, Des Moines, Iowa

[73] Assignee: Deere & Company, Moline, Ill.

[22] Filed: Dec. 26, 1972

[21] Appl. No.: 318,095

[52] U.S. Cl.................. 209/107, 209/104, 171/133
[51] Int. Cl............................................. B07b 13/04
[58] Field of Search.................... 209/107, 106, 104, 209/78, 87, 108; 171/133, 10, 15, 113

[56] References Cited
UNITED STATES PATENTS

| 527,656 | 10/1894 | Borchard | 209/78 |
|---|---|---|---|
| 2,726,662 | 12/1955 | Komuchar et al. | 209/104 X |
| 3,010,522 | 11/1961 | Oppel | 209/104 X |
| 3,294,177 | 12/1966 | Schaal et al. | 171/133 X |

FOREIGN PATENTS OR APPLICATIONS

| 920,997 | 10/1954 | Germany | 171/133 |

Primary Examiner—Allen N. Knowles
Attorney—H. Vincent Harsha et al.

[57] ABSTRACT

Root crop cleaning apparatus including a pair of adjacent, counterrotating cleaning rolls arranged in root crop receiving relation, one of the rolls being formed by a plurality of resilient disks mounted on a shaft and maintained at equal axial distances by means of smaller diameter spacers interposed between each adjacent pair of resilient disks, and the other roll being formed by a plurality of axially extending rods connected to a shaft at equal radial distances from the shaft and at equal circumferential distances from each other, the resilient disks on the one roll being yieldable axially and cooperable with the axially extending gaps between the rods on the other roll to permit rocks and other foreign objects to pass between the rolls without causing damage to the apparatus.

8 Claims, 4 Drawing Figures

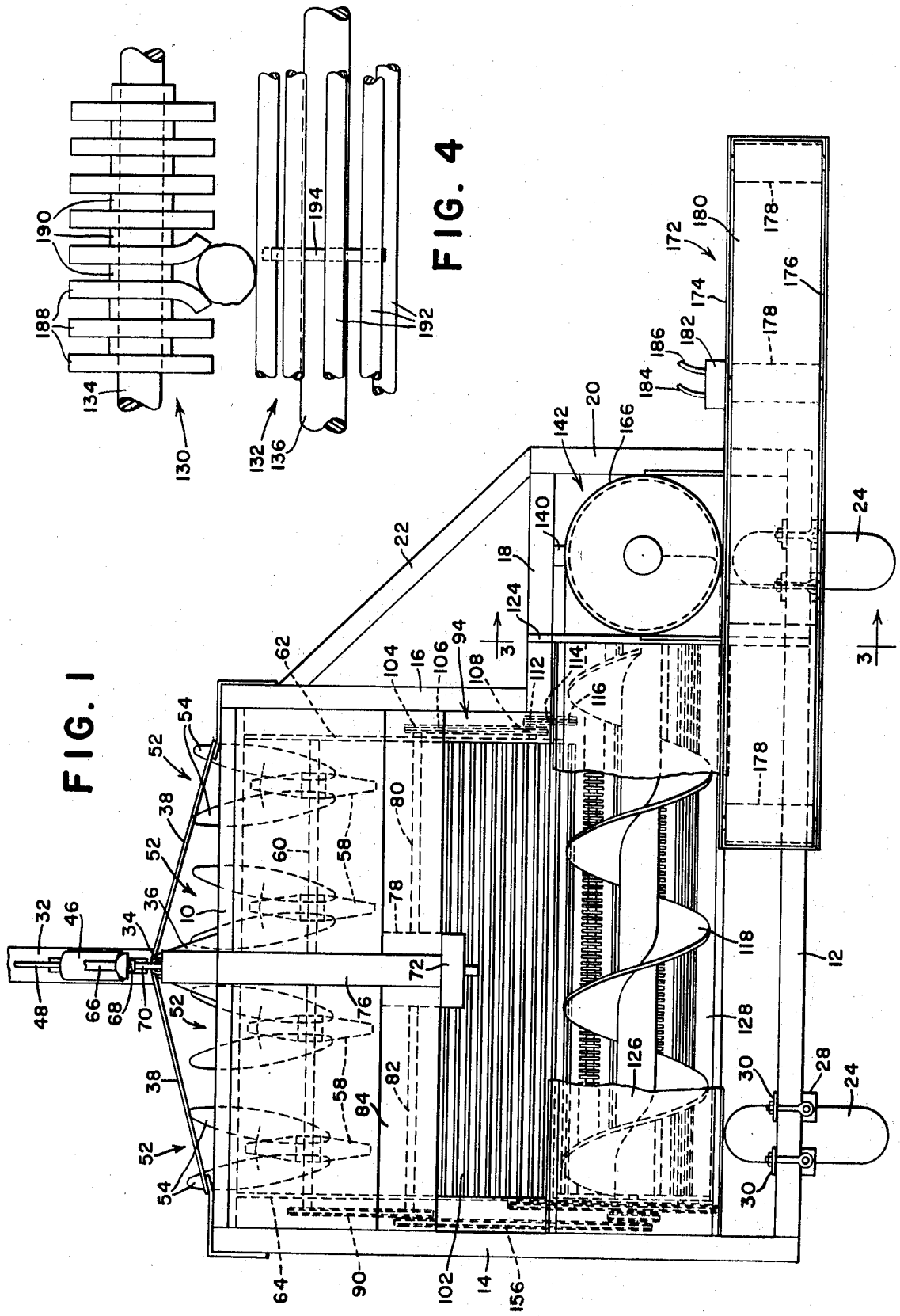

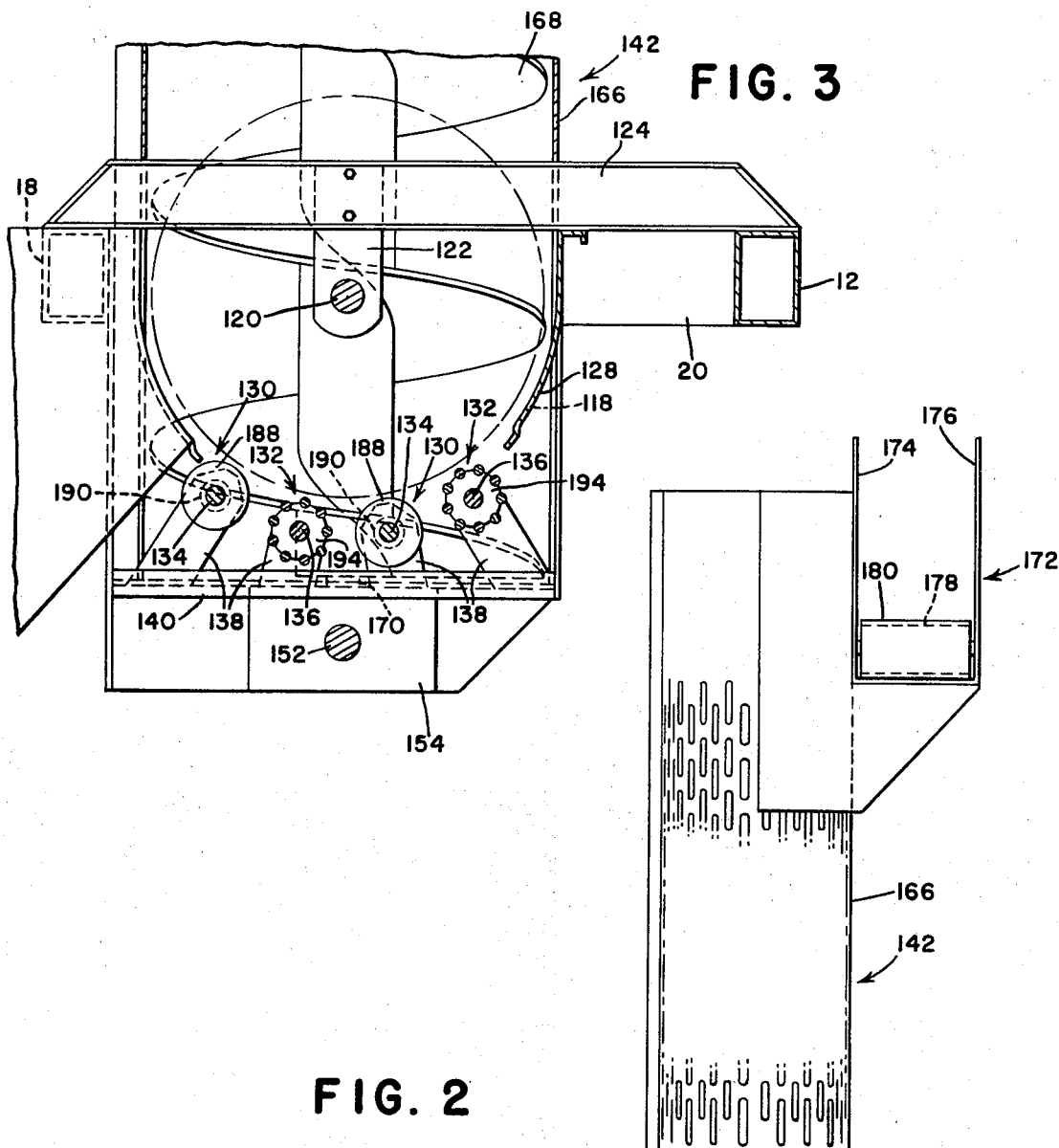

ROOT CROP CLEANING ROLLS

BACKGROUND OF THE INVENTION

The present invention relates generally to root crop cleaning apparatus and more particularly to a pair of cooperating cleaning rolls constructed so as to permit rocks and other foreign objects to pass between the rolls without causing damage thereto.

In the harvesting and processing of root crops such as beets or the like, it is necessary at some stage to clean the crop by removing the dirt which adheres to the crop when it is dug from the ground. An apparatus commonly employed for cleaning beets consists of a plurality of counterrotating, adjacent cylindrical rolls, the abrading action of the rolls being operative, as the beets are advanced along and in contact with the rolls, to remove the adhering dirt and discharge the same downwardly between the rolls. Cleaning rolls of this type are commonly supplied on beet harvester machines to clean the beets immediately following their removal from the ground, and may assume several different forms. A typical cleaning roll apparatus consists of adjacent pairs of counterrotating rolls with one or both of the rolls having a spiral ridge on its outer surface to advance the crop axially along the rolls during the cleaning operation.

Although cleaning apparatus of this type is generally considered adequate for its intended function, a problem exists where such apparatus is used in rocky soil conditions, in that rocks conveyed with the crop to the cleaning roll bed may, if of a certain size, become jammed between and damage the rolls. Two basic approaches have been taken in attempted solutions to this problem. One approach, exemplified by the mechanism disclosed in U.S. Pat. No. 3,283,895, which issued 8 Nov. 1966 to Rollins, has been to yieldably mount the ends of the roll shafts on the machine so that adjacent rolls can move away from each other to permit a rock to pass between the rolls without inflicting damage. A problem with this approach exists, however, in that the roll drive sprockets mounted on the roll shafts also move away from each other when the rolls yield, and provision must therefore be included in the roll drive mechanism to accommodate such relative movement of the drive sprockets. The other approach, as exemplified by the disclosure in U.S. Pat. No. 3,267,502, which issued Aug. 23, 1966 to Wells, consists of mounting the roll shafts on the frame in a fixed relation, so that the relation between the roll drive sprockets remains constant, and yieldably mounting the outer shell of the roll to the roll shaft so that the former is free to move radially relative to the latter to permit rocks to pass between the rolls. While this approach eliminates the need for the special drive mechanism necessitated by the first approach, it is nevertheless possessed of certain shortcomings which render it less then totally satisfactory. One such shortcoming, for example, consists of the increased complexity and expense of the roll construction.

SUMMARY OF THE INVENTION

Accordingly, it is a primary object of the present invention to provide a root crop cleaning roll apparatus wherein the cleaning rolls are constructed so as to permit rocks and other foreign objects to pass between the rolls without inflicting damage thereto, and more particularly to provide such apparatus possessed of none of the aforementioned problems associated with the prior art.

In pursuance of these and other objects, the cleaning roll apparatus of the invention comprises a pair of counterrotating cleaning rolls arranged in root crop receiving relation, one of the rolls being formed by a plurality of resilient annular disks fixed coaxially to a shaft at equal axial distances from each other, and the other roll being formed by a plurality of axially extending rods connected to a shaft at equal radial distances from the axis thereof and at equal circumferential distances from each other. The resilient disks which form the one roll are yieldable axially to increase the effective distance between the rolls and thereby permit rocks larger than the normal roll gap to pass between the rolls, and the axially extending rods forming the other roll define axial gaps into which rocks may extend to likewise increase the effective distance between the rolls. The resilient disks are sufficiently rigid so that they will not be caused to yield by the crop being cleaned. Conveying means are disposed above and adjacent to the cleaning rolls to engage and advance the crop along the rolls.

BRIEF DESCRIPTION OF THE DRAWINGS

The preferred embodiment of the present invention will be described in conjunction with the accompanying drawings in which:

FIG. 1 is a plan view of a beet harvester incorporating the cleaning apparatus of the invention;

FIG. 2 is a left side elevational view of the beet harvester shown in FIG. 1;

FIG. 3 is a sectional view taken along the line 3—3 of FIG. 1; and

FIG. 4 is an enlarged, fragmentary view of the cleaning rolls which comprise the cleaning apparatus of the invention.

DESCRIPTION OF THE PREFERRED EMBODIMENT

Referring now to the drawings, the cleaning apparatus of the invention is illustrated as incorporated in a novel beet harvester, various features of which are detailed and claimed in the following U.S. Pat. applications: Ser. No. 209,116, filed Dec. 17, 1971, Ser. No. 209,117, filed Dec. 17, 1971, Ser. No. 209,123, filed Dec. 17, 1971, now U.S. Pat. No. 3,695,360 Ser. No. 209,124, filed Dec. 17, 1971, now U.S. Pat. No. 3,721,423 and Ser. No. 229,669, filed Feb. 28, 1972. It should be understood, however, that the cleaning apparatus is not limited to use in such a harvester and may find application in various other types and kinds of root crop harvesting and processing machines.

The beet harvester illustrated includes a main supporting framework composed of a front transverse frame member 10, a rear transverse frame member 12, a left longitudinal side frame member 14 connecting the left ends of the front and rear frame members, a first right longitudinal side frame member 16 connected and extending rearwardly from the right end of the front frame member, a transverse frame member 18 connected to the rear end of the member 16 and extending outwardly therefrom, a second right longitudinal side frame member 20 connecting the right ends of the frame members 18 and 12, and a diagonal brace member 22 connecting a forward portion of the member 16 with the front end of the member 20. The rear of the frame is supported by a pair of ground-engaging wheels 24 mounted in a transversely adjustable manner on the rear transverse frame member 12. Each wheel 24 is rotatably supported on an axle 26 which extends between the legs of the U-shaped support member or fork 28. Each fork 28 is connected to the rear transverse frame member 12 by a pair of clamp assemblies 30 which are releasable to permit lateral adjustment of the fork on the frame member 12 so that the wheels 24 may be positioned to accommodate various row spacings.

The forward end of the main frame is supported by a hitch member 32 shown fragmentarily in the drawings and adapted at its forward end for connection to the drawbar of a tractor. The rear of the hitch member 32 is connected to the main frame for relative pivotal movement about both vertical and transverse axis. The vertical axis is defined by a shaft 34 (see FIG. 1) which is supported on the front frame member 10 by a pair of generally triangular, vertically spaced plates 36 which are connected to and extend forwardly from the frame member 10, and a pair of brace members 38 which are connected to opposite sides of the member 10 and converge forwardly to the apex of the triangular plates 36. Pivot members 40 and 42 are fixed to the upper and lower ends, respectively, of the pivot shaft 34 and are rotatable therewith. The rear end of the hitch member 32 is connected to the lower member 42 for vertical pivotal movement about a connecting pin 44. The vertical position of the hitch relative to the main frame is adjusted by means of a hydraulic cylinder 46 which interconnects a bracket 48 secured to the top side of the hitch member 32 and a bracket 50 on the front side of the member 40. The lateral position of the hitch member 32 about the pivot shaft 34 is controlled by a conventional row finder unit and hydraulic cylinder which are not shown in the drawings since they form no part of the present invention.

Mounted on the front transverse frame member 10 and movable vertically therewith into and out of engagement with the ground are a plurality of transversely spaced digger wheel units 52, each unit comprising a cooperating pair of digger wheels 54 rotatably supported on opposite sides of a vertical standard 56 connected at its upper end to the front frame member 10 for relative lateral adjustment. The digger wheel units are adjustable relative to the frame member 10 to accommodate various row spacings. Associated with each digger wheel unit 52 is a paddle wheel 58 which extends between the upper rear portions of wheels 54. The paddle wheels 58 are supported on a common transverse shaft 60 which is rotatably supported at opposite ends in vertical support plates 62 and 64 on the right and left sides, respectively, of the frame. The paddle wheels are mounted on the shaft 60 so that they can be adjusted laterally with their associated digger wheel units.

The paddle wheels 58 are driven in a counterclockwise direction as viewed in FIG. 2 by the shaft 60 to engage and advance rearwardly beets removed from the ground by the digger wheels 54. Power is supplied for driving the shaft 60, as well as for driving the other operating components on the harvester which have not yet been described, from the power take-off shaft of the tractor. A first shaft 66 is connected at its forward end to the tractor power take-off shaft (not shown) and at its rearward end by means of a universal connection 68 to the forward end of a frame supported shaft 70. The shaft 70 is rotatably supported at its rear end in a transfer box 72 and its forward end is journaled on a support member 74 fixed to the front frame member 10. An inverted U-shaped shield 76 covers the shaft 70. A chain in the transfer box 72 transmits power from the rear end of the shaft 70 to the input shaft of a gear box 78 which in turn drives a pair of shafts 80 and 82 extending transversely outwardly from the gear box 78 and journaled at their outer ends in support plates 62 and 64, respectively. The gearing within the gear box 78 is arranged so that the shafts 80 and 82 are driven in opposite directions, the shaft 82 being driven in a counterclockwise direction as viewed in FIG. 2 and the shaft 80 being driven in a clockwise direction when viewed in the same manner. The shafts 80 and 82 are covered by a shield 84 which extends transversely between the frame members 14 and 16 and serves also as a support for the gear box 78. A pair of sprockets 86 and 88 are mounted on the extreme outer end of the shaft 82. A chain 90 drivingly connects the sprocket 86 on the shaft 82 with a sprocket 92 on the extreme outer end of the paddle wheel support shaft 60, to drive the latter and thereby the paddle wheels in a counterclockwise direction as viewed in FIG. 2.

In operation, the paddle wheels 58 are thus operative to engage beets which have been lifted from the ground by the digger wheels 54 and advance them rearwardly. The beets are delivered by the paddle wheels to a chain conveyor designated generally by the numeral 94 which extends transversely between the support plates 62 and 64 and upwardly and rearwardly from a point directly behind the digger wheel units 52. The conveyor 94 includes upper and lower transverse shafts 96 and 98, respectively, which extend between and are journaled on the support plates 62 and 64. A plurality of sprockets 100 are mounted on the shafts 96 and 98 and engage an endless conveyor chain 102 to drive the same in a clockwise direction as viewed in FIG. 2. Power is transmitted to the chain conveyor 94 from a sprocket 104 on the outer end of the shaft 80 by means of a chain 106 which drivingly connects the sprocket 104 with a sprocket 108 mounted on the right end of a shaft 110 which extends transversely between the support plates 62 and 64 between the upper and lower runs of the conveyor chain 102. A second sprocket 112 is mounted on the right end of the shaft 110 and is drivingly connected by means of a chain 114 to a sprocket 116 on the right end of the upper conveyor shaft 96, to drive the shaft 96 and thereby the conveyor chain 102 in a clockwise direction as viewed in FIG. 2. In operation, the chain conveyor 94 is thus operative to receive beets delivered rearwardly by the paddle wheels 58 and deliver the same upwardly and rearwardly.

Extending across the rear of the machine is a transverse conveyor in the form of a large diameter auger 118, the auger including a central shaft 120 journaled at its left end in the support plate 64 and at its right end in a bracket 122 depending from a bar 124 extending between the frame members 12 and 18. The upper and rear portions of the auger are enclosed by means of arcuate shields 126 and 128, respectively, which are coextensive with the auger 118. A trough is formed for the auger by two pairs of transversely extending cleaning rolls 130 and 132, the axes of the rolls being disposed at equal radial distances from the shaft 120 of the auger 118 so that the rolls define an arcuate beet receiving trough immediately beneath the auger. The detailed construction of the rolls 130 and 132 will be described hereinafter; for present purposes it will suffice to explain that the rolls 130 and 132 include central shafts 134 and 136, respectively, the left ends of the shafts being journaled in the support plate 64 and the right ends of the shafts being journaled in brackets 138 fixed to a transverse member 140 forming a portion of a housing 142 on the right side of the machine which will be subsequently described. Adjacent cleaning roll pairs 130 and 132 are driven in opposite directions from the shaft 110 through drive means comprising a sprocket 144 on the left end of the shaft 110, sprockets 146 on the left ends of each of the cleaning roll shafts 134 and 136, and idler sprocket 148 supported on the left support plate 64 rearwardly of the sprockets 146, and a chain 150 drivingly connecting the sprocket 144 on the shaft 110 with the sprockets 146 and 148.

The auger 118 is driven to advance beets deposited by the chain conveyor 94 into the arcuate trough formed by the cleaning rolls 130 and 132 transversely toward the right side of the machine, from the sprocket 88 on the outer end of the left shaft 82. The drive train includes a transverse countershaft 152 journaled at its left end beneath the auger shaft 120 in the left support plate 64 and journaled at its right end in a gear box 154 mounted on the lower side of the housing 142. The countershaft 152 is driven by means of a chain 156 which connects the sprocket 88 on the shaft 82 with a first sprocket 158 on the left end of the shaft 152, and the auger 118 is driven from the countershaft 152 by a chain 160 which connects a second sprocket 162 on the left end of the countershaft 152 with a sprocket 164 on the left end of the auger shaft 120.

The beets conveyed toward the right side of the machine by the auger 118 are delivered through an opening in the bottom end of the housing 142. The housing 142 is supported between the frame members 12 and 18 just inwardly of the frame member 20, and includes a vertically extending cylindrical wall 166 which encloses a vertical auger conveyor 168. The auger 168 includes a shaft 170 which is supported at its lower end in the gear box 154 and at its upper end in the top wall of the housing 142 (not shown). The auger is rotated to convey beets upwardly through the housing 142 by means of bevel gearing contained within the gear box 154 which drivingly connects the right end of the horizontal shaft 152 with the lower end of the auger shaft 170.

Supported on the upper end of the housing 142 is a transverse conveyor designated generally by the numeral 172. The conveyor 172 includes a supporting framework having a pair of upright walls 174 and 176 and an endless belt-type conveyor disposed between the lower portions of the walls and including a plurality of rollers 178 extending between and journaled in the walls 174 and 176 and an endless flexible conveying element 180 drivingly trained around the rollers 178. Power is furnished for driving the conveyor 172 by a hydraulic motor 182 which drives one of the rollers 178. The hydraulic motor 182 is supplied with hydraulic fluid under pressure from a source on the tractor through hydraulic lines 184 and 186. In operation, beets conveyed upwardly by the vertical auger 168 are discharged rearwardly through an opening in the upper end of the housing 142 which communicates with an opening in the wall 174 of the transverse conveyor support, onto the upper run of the conveying element 180. The element 180 is operative to convey the beets transversely to the right end of the conveyor 172, where they are dropped into a suitable receptacle, which conventionally consists of a truck driven alongside the harvester.

The cleaning rolls 130 and 132, shown best in FIGS. 3 and 4, will now be described in greater detail. The roll 130 is composed of a plurality of resilient, annular disks 188 coaxially received on the shaft 134, and a plurality of spacer disks 190 co-axially received on the shaft 134 between the resilient disks 188 and operative to maintain a uniform axial distance between each of the disks 188. As shown in FIG. 4, the spacer disks 190 have a substantially smaller diameter than the resilient disks 188, so that the latter are free to yield axially.

The roll 132 is composed of a plurality of axially extending rods 192 which are connected to the shaft 136 by means of a plurality of axially spaced, generally circular plates 194. The rods 192 are disposed about the shaft 136 at equal radial distances from the axis thereof and at equal circumferential distances from each other. It will be apparent from FIG. 4 of the drawings that when a rock or other obstruction of a certain size is introduced between adjacent rolls 130 and 132, the resilient disks 188 on the roll 130 are free to yield axially to, in effect, increase the distance between the rolls and thereby permit the object to pass between the rolls. In addition, it will be appreciated that the object may extend within the axial gap between adjacent rods 192 on the roll 132 to likewise increase the effective distance between the rolls and further assist in passing the object between the rolls. It will be understood, of course, that the resilient disks are sufficiently rigid so that they will not be caused to yield by beets being conveyed along the rolls by the auger 118.

I claim:

1. Root crop cleaning apparatus comprising: a supporting frame; a pair of adjacent, parallel cleaning rolls arranged on the frame in root crop receiving relation and each having a supporting shaft; means rotatably mounting said shafts on the frame at a fixed distance from each other; one of said rolls being formed by a plurality of resilient annular disks fixed to the respective shaft coaxially therewith and spaced at equal axial distances from each other; the other of said rolls being formed by a plurality of axially extending rods connected to the respective shaft at equal radial distances from the axis of the shaft and at equal circumferential distances from each other; drive means on the frame for rotating the rolls in opposite directions; and means on the frame for conveying root crops axially along the rolls.

2. The invention defined in claim 1 wherein said one roll is formed by a plurality of separate, resilient disks apertured at their centers for axial insertion on the respective shaft, and a plurality of separate spacer disks apertured at their centers for axial insertion on the shaft, said spacer disks having a smaller diameter than the resilient disks and one of the spacer disks being interposed between each adjacent pair of resilient disks.

3. The invention defined in claim 1 wherein the shaft for said other roll is coextensive with the roll and wherein said other roll is formed by a plurality of disks fixed coaxially to the shaft in axially spaced relation, and a plurality of axially extending rods interconnecting the outer edges of adjacent disks at equal radial distances from the shaft and at equal circumferential distances from each other.

4. The invention defined in claim 1 wherein said means for conveying root crops axially along the rolls comprises an auger disposed above said rolls, the axis of the auger being parallel to the axes of the rolls and spaced at equal radial distances therefrom.

5. Root crop cleaning apparatus comprising: a supporting frame, a pair of adjacent, parallel cleaning rolls arranged on the frame in root crop receiving relation and each having a supporting shaft; means rotatably mounting said shafts on the frame at a fixed distance from each other; one of said rolls being formed by a plurality of resilient, annular disks fixed to the respective shaft coaxially therewith and spaced at equal axial distances from each other; drive means on the frame for rotating the rolls in opposite directions; and means on the frame for conveying root crops axially along the rolls.

6. The invention defined in claim 5 wherein said one roll is formed by a plurality of separate, resilient disks apertured at their centers for axial insertion on the respective shaft, and a plurality of separate spacer disks apertured at their centers for axial insertion on the shaft, said spacer disks having a smaller diameter than the resilient disks and one of the spacer disks being interposed between each adjacent pair of resilient disks.

7. Root crop cleaning apparatus comprising: a supporting frame, a pair of adjacent, parallel cleaning rolls arranged on the frame in root crop receiving relation and each having a supporting shaft; means rotatably mounting said shaft on the frame at a fixed distance from each other; one of said rolls being formed by a plurality of axially extending rods connected to the respective shaft at equal radial distances from the axis of the shaft and at equal circumferential distances from each other; drive means on the frame for rotating the rolls in opposite directions; and means on the frame for conveying root crops axially along the rolls.

8. The invention defined in claim 7 wherein the shaft for said one roll is coextensive with the roll and wherein said one roll is formed by a plurality of disks fixed coaxially to the shaft in axially spaced relation, and a plurality of axially extending rods interconnecting the outer edges of adjacent disks at equal radial distances from the shaft and at equal circumferential distances from each other.

* * * * *